United States Patent
Heinrich et al.

(10) Patent No.: US 9,513,376 B1
(45) Date of Patent: Dec. 6, 2016

(54) LOW-COST HIGH INTEGRITY INTEGRATED MULTI-SENSOR PRECISION NAVIGATION SYSTEM

(71) Applicant: Rockwell Collins, Inc., Cedar Rapids, IA (US)

(72) Inventors: Richard E. Heinrich, Marion, IA (US); Angelo J. Joseph, Melbourne, FL (US); Keith L. Kerley, Satellite Beach, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 570 days.

(21) Appl. No.: 13/626,516

(22) Filed: Sep. 25, 2012

(51) Int. Cl.
*G01S 19/46* (2010.01)
*G01S 19/45* (2010.01)
*G01S 19/47* (2010.01)

(52) U.S. Cl.
CPC ............ *G01S 19/45* (2013.01); *G01S 19/47* (2013.01)

(58) Field of Classification Search
CPC .......... G01S 19/45; G01S 19/46; G01S 19/47
USPC ........................................ 342/357.29, 357.3
See application file for complete search history.

(56) References Cited

U.S. PATENT DOCUMENTS

| | | | | |
|---|---|---|---|---|
| 5,955,987 A | * | 9/1999 | Murphy et al. | 342/357.29 |
| 7,623,871 B2 | * | 11/2009 | Sheynblat | G01S 1/026 342/357.31 |
| 7,904,243 B2 | * | 3/2011 | Cohen et al. | 701/470 |
| 7,925,274 B2 | * | 4/2011 | Anderson et al. | 455/456.1 |
| 2010/0176990 A1 | * | 7/2010 | Green et al. | 342/357.12 |
| 2011/0059752 A1 | * | 3/2011 | Garin et al. | 455/456.1 |
| 2011/0068973 A1 | * | 3/2011 | Humphreys et al. | 342/357.3 |
| 2012/0044104 A1 | * | 2/2012 | Schloetzer | 342/128 |

* cited by examiner

*Primary Examiner* — Frank J McGue
(74) *Attorney, Agent, or Firm* — Angel N. Gerdzhikov; Donna P. Suchy; Daniel M. Barbieri (57) ABSTRACT

The disclosed invention embodies a system and method for multi-sensor, multi-frequency, multi-constellation data integration providing integrated onboard positioning of a vehicle. Multiple correlators perform autonomous signal quality monitoring to avoid the need for external augmentation systems. The integrated method and system typically includes multi-constellation, multi-channel GNSS and may consider positioning information from one or more other positioning resources including onboard, airborne, and ground-based signals. The positioning information from these functions are used in combination to exclude an erroneous signal from consideration while providing an integrated, blended precision positioning solution with improved size, weight, power and cost characteristics. The system utilizes a plurality of positioning signals from multiple GNSS constellations on multiple channels correlated with ground-based, airborne, and onboard positioning signals to determine a hierarchy of positioning signals used in accurate positioning without the need for differential correction provided by offboard augmentation.

27 Claims, 6 Drawing Sheets

LOW-COST HIGH INTEGRITY INTEGRATED MULTI-SENSOR PRECISION NAVIGATION SYSTEM

TECHNICAL FIELD

The present invention relates generally to accurate positioning methods and systems for a vehicle and, more particularly, to integrated vehicle positioning utilizing positioning information from a number of positioning resources to maintain accurate position information in hostile and/or difficult environments.

BACKGROUND

Currently available positioning systems typically include multiple sensors organized into discrete systems. For example, a Global Navigation Satellite System (GNSS) is typically deployed as one discrete system, a Distance Measurement Equipment (DME) system is typically deployed as another discrete system, an inertial reference system is typically deployed as another discrete system, and the VHF Omnidirectional-Range (VOR) as yet another discrete system. In addition, detecting specific GNSS satellite system failures, sometimes referred to as evil waveform monitoring, conventionally relies on ground based monitoring stations which share system failure information either via a Notice to Airmen (NOTAM) or are relayed directly to a vehicle using a notification system such as the Space Based Augmentation Service (SBAS).

The precision of the position is continuously monitored onboard many vehicles since specific airspace access is conditional on the monitored positioning performance. For example, a specific track in continental airspace may require a positioning system onboard an aircraft desiring airspace access to maintain a Required Navigation Performance (RNP) value of 5.0 nautical miles (NM). Should the Actual Navigation Performance (ANP) of onboard positioning systems be unable to comply with the RNP value of 5.0, published standards may disallow the aircraft from entering or continuing on the specific track.

Precision position sensing required for enhanced airspace operations, such as RNP, often requires integration of positioning information from a combination of these discrete sensor systems. System integration can require costly additional hardware, custom software, wiring and cable interfaces. The resulting "blended" precision position is reported as the ANP. At the same time, pressure continues to mount to reduce the size, weight, power and cost (SWaPC) of airborne positioning systems.

High density, complex aircraft operations may rely on precise positioning to meet the RNP established for a particular airspace. For example, to begin a specific instrument approach to a specific runway, an aircraft positioning system may be required to maintain an RNP value of 0.3 NM. Should the ANP of positioning systems and methods be unable to accurately position the aircraft within this RNP, published statutory regulation may prohibit the aircraft from beginning the approach. To meet such performance requirements, prior art precision position sensing methods may utilize multiple, discrete integrated sensors to meet the operational requirements for enhanced airspace operations. (e.g. RNP/ANP, approach, landing, etc.) Pressure from regulators and aircraft integrators to improve the availability and reliability of vehicle positioning methods and systems as well as reduction in size, weight, required power, and cost (SWaPC) may require an enhanced alternative.

In order to meet the integrity requirements for these operations, airborne receivers are currently aided by offboard augmentation solutions. Such offboard augmentation may include the aforementioned SBAS and a Ground Based Augmentation System (GBAS). Without these offboard augmentation systems, inaccurate signals may adversely affect precise positioning systems. Evil waveforms, outages (both planned and unplanned), atmospheric anomalies, jamming (both self and hostile) are many of the threats that may be monitored by these systems.

In addition, traditional onboard positioning systems benefiting from offboard augmentation may require additional receiving equipment onboard the vehicle. For example, a Localizer Performance with Vertical guidance (LPV) approach may require onboard WAAS receiver installation to enable accurate LPV navigation. Such WAAS or Local Area Augmentation System (LAAS) may require an additional Very High Frequency (VHF) Data Broadcast (VDB) receiver mounted on the vehicle to ensure reception of augmentation signals.

There is, therefore, a continuing need for new on-vehicle alternatives to improve positioning precision and integrity without the use of ground or space based augmentation solutions. This solution needs to mindful of the cost of increases in size and weight and should strive for reduced size, weight, power, and cost of the positioning systems. With multi-frequency and multi-constellation capability, a desirable method and system may provide signal monitoring and erroneous signal exclusion performed autonomously (e.g. onboard the vehicle) without offboard augmentation.

SUMMARY

The invention may be preferably embodied in a method for integrated multi-sensor positioning of a vehicle. The method comprises: receiving and interpreting a plurality of space based positioning signals, the plurality of space based positioning signals transmitted by diverse constellations of satellites on multiple frequencies, receiving and interpreting a plurality of ground based positioning signals, the plurality of ground based positioning signals transmitted by diverse ground based stations, scoring a level of health of each positioning signal of: the plurality of space based positioning signals and the plurality of ground based positioning signals, determining a hierarchy of the received positioning signals based at least on: the level of health of the positioning signal, a history of positioning signal accuracy, a vote of positioning signal accuracy, and a score of positioning signal accuracy, eliminating, from the hierarchy, at least one positioning signal from: the plurality of space based positioning signals and the plurality of ground based positioning signals, based on the level of health, correlating at least two of the received positioning signals based on the hierarchy to determine a blended position solution.

An additional embodiment of the present invention is directed to an onboard system for integrated multi-sensor positioning of a vehicle. The system comprising: a receiver configured to receive and interpret a plurality of space based positioning signals and a plurality of ground based positioning signals, a health monitor configured for: scoring a level of health of each of the received positioning signals, determining a hierarchy of the received positioning signals based at least on: the level of health of the positioning signal, a history of positioning signal accuracy, a vote of positioning signal accuracy, and a score of positioning signal accuracy, eliminating, from the hierarchy, at least one positioning signal based on the level of health, a correlator configured for correlation of at least two of the received positioning signals to determine a blended position solution, the correlation based on the hierarchy and the level of health.

An additional embodiment of the present invention is directed to a computer readable medium having non-transitory computer readable program code embodied therein for integrated multi-sensor positioning of a vehicle, the computer readable program code comprising instructions which, when executed by a computer device or processor, perform and direct the steps of: receiving and interpreting a plurality of space based positioning signals, the plurality of space based positioning signals transmitted by diverse constellations of satellites on multiple frequencies, receiving and interpreting a plurality of ground based positioning signals, the plurality of ground based positioning signals transmitted by diverse ground based stations, scoring a level of health of each positioning signal of: the plurality of space based positioning signals and the plurality of ground based positioning signals, determining a hierarchy of the received positioning signals based at least on: the level of health of the positioning signal, a history of positioning signal accuracy, a vote of positioning signal accuracy, and a score of positioning signal accuracy, eliminating, from the hierarchy, at least one positioning signal from: the plurality of space based positioning signals and the plurality of ground based positioning signals based on the level of health, correlating at least two of the received positioning signals based on the hierarchy to determine a blended position solution.

An additional aspect of the present invention may comprise receiving and interpreting a plurality of onboard positioning signals, the plurality of onboard positioning signals based on at least one onboard positioning system, the hierarchy of received positioning signals determined from the plurality of satellite based signals, the plurality of ground based signals, and the plurality of onboard signals.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE FIGURES

The numerous advantages of the invention may be better understood with reference to the accompanying figures in which.

DETAILED DESCRIPTION OF ILLUSTRATIVE EMBODIMENTS

The present invention may be embodied in a multi-sensor integrated positioning system for use onboard vehicles, such as an aircraft in both manned and unmanned aerial vehicle applications. For example, the invention may be deployed as an improvement to the Rockwell Collins avionics suites used in manned and unmanned applications.

In operation, the present invention may utilize at least one signal from a GNSS (GPS, GLONASS, Galileo or Beidou) in combination with additional onboard systems (such as distance measurement equipment DME, LORAN, NDB, VOR, or the like), and onboard inertial reference systems (traditional or evolutionary like MicroElectro-Mechanical System—MEMS) to continuously derive a high integrity blended precision position solution. The invention determines the precision position solution without the use of offboard augmentation such as that provided by Space-based Augmentation Systems (SBAS), Ground-based Augmentation Systems (GBAS) (or other permanent or temporary ground or airborne augmentation systems).

Conventional navigation systems may typically deploy GNSS, DME, VOR, and an inertial reference system as discrete systems, which may be integrated in the main navigation system through the use of integration interfaces, wiring and software. This typically requires separate enclosures for each sensor system, heavy racks to hold multiple enclosures, cable interfaces, wiring, and custom software to interconnect the various systems. With the present invention, all three systems, along with additional positioning resources, are integrated into a single system with the controllers deployed in a single enclosure to provide an integrated precision positioning solution with improved size, weight, power and cost characteristics. The DME, inertial, and additional positioning resources may be considered in the detection of inaccurate GNSS positioning signals and in the integrated precision position solution. These other positioning resources may also be used in back-up and navigation recovery modes, for example when there are not enough GNSS satellites in view to obtain the desired level of accuracy from the GNSS system.

Preferably, the multi-sensor integrated positioning system is capable of using multi-constellation, multi-channel GNSS signals correlated with ground-based and onboard positioning signals to provide precise vehicle positioning without the need for SBAS or GBAS augmentation. For example, 64 tracking channels with eight correlators per channel may be used to perform GNSS signal quality monitoring and detect inaccurate GNSS positioning signals, such as those resulting from jamming, evil waveforms associated with satellite failures, bad weather, electromagnetic interference, and other sources of GNSS positioning signal inaccuracy. Inaccurate GNSS positioning signals are detected and eliminated from consideration in the integrated precision positioning solution without the need for differential correction provided by offboard SBAS or GBAS augmentation. This eliminates the need for SBAS and GBAS, reducing the cost and complexity of the system.

It should be appreciated that in many cases the primary concern in GNSS availability is not the availability of an entire constellation, but the ability to "see" (to receive accurate information from) a sufficient number of properly functioning satellites to compute a precision position solution. In a conventional system, the GNSS position is based on a single GNSS constellation, receiving differential position augmentation to improve accuracy, but without considering any other positioning resources located onboard or offboard the vehicle. For example, in a pure GPS system, an operator may wait for the system to receive positioning signals from at least three to five satellites before accurate positioning information may be available. The system may then receive augmentation signals from a GBAS or SBAS system to correct errors. Should a situation arise where only two of the GPS satellites are within view, the system may not provide accurate GNSS information for accurate positioning. In this case, the system may revert to a backup mode of operation providing a degraded (e.g., inertial only) positioning to an operator. In some cases, this may be a waste of valuable and readily available positioning information, particularly in back-up and recovery modes when GNSS-based positioning signals are not available at the desired accuracy.

Each GNSS constellation (GNSS, Galileo, GPS, Compass, BeiDou, IRNSS, GLONASS, etc.) is made up of multiple satellites in orbit. A precision position solution typically requires computation of ranging information from at least five satellites. The present invention is configured to utilize knowledge of the timing between the satellites in different constellations so that positioning signals received from satellites in different constellations may be used to compute precision position solutions. This allows a precise position solution to be based on any mix of five or more satellites even when those satellites reside in different constellations. In a rich multi-constellation environment, this greatly increases the number of precision position solutions that can be derived from different combinations of positioning signals, with some or all of the solutions considering satellites in different constellations. A plurality of correlators (preferably eight per channel) are used to monitor positioning signal quality and to identify and eliminate erroneous positioning signals with the greatest error from the final, integrated precision position determination.

Considering non-GNSS positioning resources in the integrated precision position solution produces a significant improvement over conventional positioning systems. The instant invention use of positioning signals from multiple diverse constellations produces another significant improvement over conventional navigation systems, while allowing precision position solutions based on combinations of satellites residing in different constellations multiplies the benefits to the point where differential position augmentation (r.g., SBAS, GBAS) is no longer required to provide sufficient positioning accuracy for RNP enhanced airspace operations.

It should be further appreciated that eliminating a satellite with the greatest error is equivalent to eliminating a positioning signal corrupted by jamming, intentional error, satellite failure, bad weather, electromagnetic interference, or other types of positioning signal inaccuracy. By considering a larger number of satellites in multiple constellations the invention allows this type of strategic satellite elimination without falling below the minimum number of satellites "in view" required for precision position determination. Consideration of other non-GNSS positioning resources improves the detection of erroneous GNSS positioning signals, the precision positioning solution (particularly when the desired level of accurate GNSS positioning signals are not available, and in back-up and recovery modes.

More generally described, the invention allows the onboard positioning system to pick the optimum geometry of satellites for an optimum position solution. In addition, the invention greatly decreases the chances of the positioning system falling below the minimum number of satellites when eliminating inaccurate satellites from consideration, which may be considered a system fault known as a "Receiver autonomous integrity monitoring (RAIM) Outage." Unlike a pure RAIM system, the instant invention provides autonomous signal quality monitoring of all received signals (from diverse constellations) by comparing a more diverse array of position solutions and determining the best solutions to blend for transmission to the operator.

While the use of multiple GNSS constellations greatly increases the number of space based solutions available to the system, the GNSS-based solutions may be further blended with other types of positioning information available from sensors located onboard the vehicle to allow continued navigation even in the presence of interference, jamming, equipment failure, or other space based outage or degraded condition. The additional positioning resources factored into the precision position determination may include positioning solutions from onboard resources (e.g., DME/DME and internal reference equipment, such as MEMS inertial reference equipment), onboard positioning solutions calculated using signals from airborne resources (e.g., an aircraft broadcasting UAT, ADS-B or TCAS positioning signals), onboard positioning solutions calculated using signals from fixed, surveyed ground-based RF broadcasting sites (e.g., cellular telephone, radio and television broadcast towers).

As a particular example, a robust fault tolerant integrated multi-sensor positioning system can be provided through the use of 64 discrete receivers, each using a different frequency or code channel (e.g., CDMA) to receive positioning information from an array of diverse satellites. Any selection of five or more satellites can then be correlated to provide a precision position determination. Up to eight correlators per channel may be provided for signal monitoring and the detection of erroneous GNSS signals, which are excluded from the integrated precise position solution.

Preferably in the present system, the use of differential position augmentation (e.g., SBAS and GBAS) from sources located offboard the vehicle is not required. Nevertheless, it should be noted that the blending or merging of position data from multiple sensor systems onboard the vehicle may be considered to be a form of "augmentation." However, the signals relied on herein may be limited to positioning signals only and do not include informational signals such as differential corrections and integrity messages to enhance GNSS accuracy. To provide a few additional examples, the integrated positioning system may additionally or alternatively include an Inertial Reference Systems (IRS), Inertial Reference Unit (IRU), Fixed Surveyed RF emitters (triangulation from cell towers, FM broadcast towers, TV broadcast towers, etc.), varying gyroscopic sensors, (wineglass, iron, ring laser, etc.), traffic collision avoidance system (TCAS) directional transponder TCAS, ADS-B or UAT position information received from other aircraft, and so forth. Each combination of sensors and systems may have different performance characteristics when blended to fill the gaps experienced during outages of the primary GNSS positioning source. It should also be appreciated that the specific examples of positioning resources considered by the integrated precision position system is merely an illustrative list. This candidate list is not meant to be exhaustive and other sensors, and different combinations of sensors, may be integrated, as desired.

An additional aspect of the present invention may comprise onboard integrated multi-sensor positioning of a vehicle, which may be configured for manned and unmanned aerial vehicles. The integrated multi-sensor positioning may be configured to receive signals originating from multi-constellation, multi-channel GNSS systems, onboard DME and VOR systems, and onboard inertial reference systems. The onboard system for integrated multi-sensor positioning of a vehicle may also consider position information from other offboard positioning resources, such as airborne resources (e.g., Traffic Alert and Collision Avoidance System (TCAS) positioning information) and position determination based on fixed, surveyed RF broadcasting ground-based resources (e.g., cellular telephone, radio and television broadcast towers) to assist in the identification and elimination of an erroneous positioning signal and in the computation of an integrated precision position solution. These positioning information resources are used in combination to provide a blended integrated precision position solution with improved size, weight, power and cost characteristics.

An additional aspect of the present invention may include analysis of positioning signals from multiple GNSS satellites in multiple constellations using multiple frequency or signaling codes (e.g., TDMA, CDMA, etc.) and channels to improve positioning accuracy. The present invention may preferably monitor and detect inaccurate GNSS positioning signals, such as those caused by jamming and evil waveforms resulting from satellite failure. In a specific embodiment, 64 tracking channels may be monitored to receive positioning signals from up to 64 different satellites residing in different satellite constellations. Also in this specific embodiment, up to eight correlators per channel are provided to track signals from the same satellite and monitor signal quality. The correlators may be set up to track different signals from the same satellite and, in addition, they may be used to perform autonomous signal quality monitoring and detect inaccurate positioning signals resulting from jamming or evil waveforms associated with satellite failures. This autonomous integrity monitoring may provide an enhanced worldwide RNP and LPV capability without a requirement for external signal augmentation such as SBAS and GBAS.

The positioning signals from the various positioning resources are compared to each other to detect erroneous positioning signals, such as those resulting from jamming, satellite failure, bad weather, electromagnetic interference, or other sources of GNSS positioning system inaccuracy. The erroneous positioning signals are then excluded from the integrated precision position solution which may provide an accuracy necessary to comply with a specific RNP for a particular airspace. Embodiments may provide such accuracy, without the need for differential correction provided by SBAS or GBAS augmentation.

In embodiments, onboard DME, inertial reference and other positioning solutions calculated using available airborne and ground based signals may also be considered in 1) the detection of erroneous positioning signals and in 2) the blended integrated precision position solution. These additional positioning information resources may also be used in back-up and recovery modes in the event that GNSS-based positioning signals are not available at the desired level of accuracy. It should be understood that certain types of non-GNSS position information resources are pointed out as specific examples of additional positioning information that may be considered in the integrated precision position solution and/or as back-up and recovery positioning resources. This should not be considered an exclusive list of auxiliary positioning resources. Any available source of position information available, both onboard and offboard the vehicle may be considered as part of the integrated system, which may be deployed in original equipment, upgrade and retrofit configurations.

Figure 1:
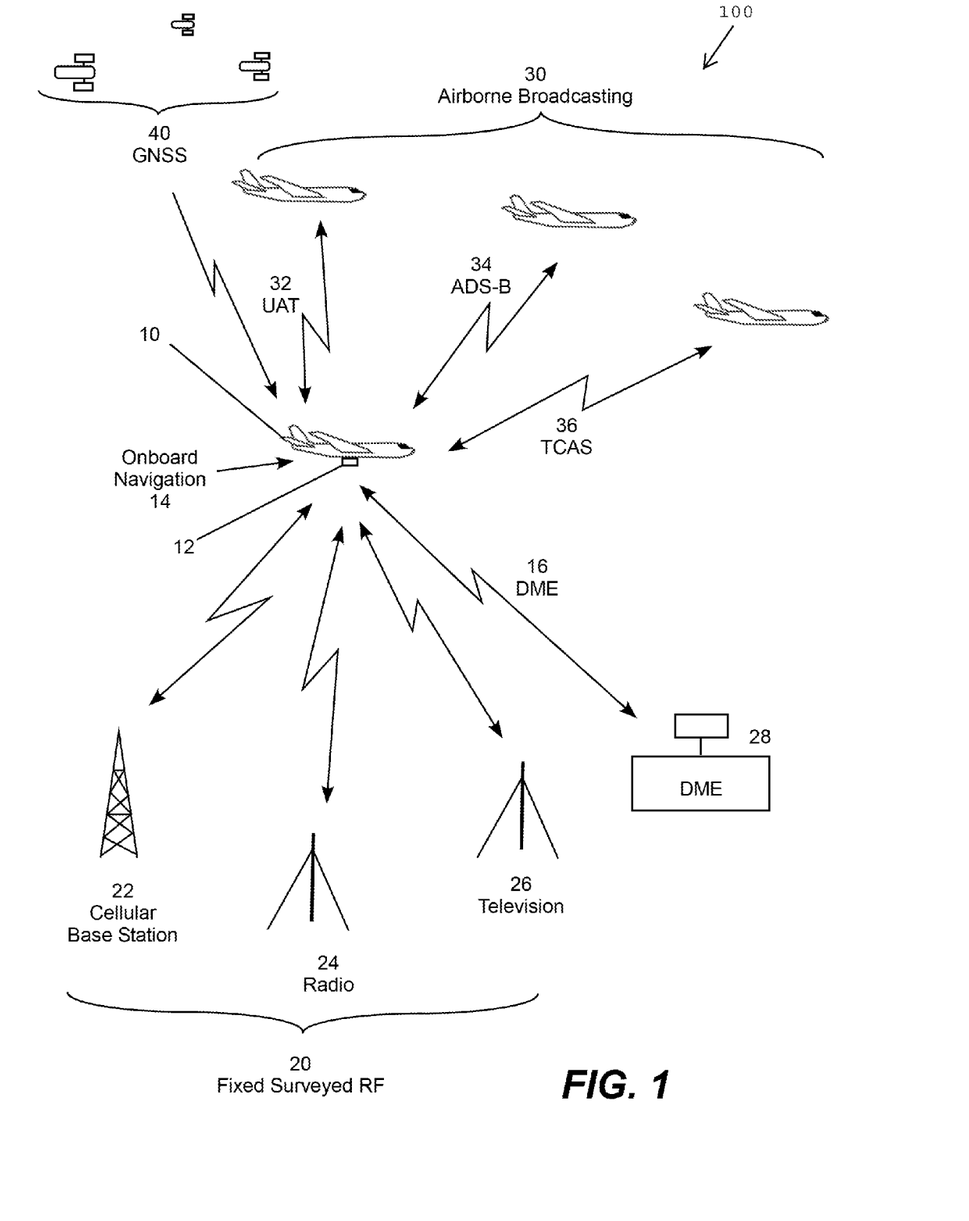
FIG. 1 is a conceptual illustration of a vehicle utilizing integrated multi-sensor positioning representative of a preferred embodiment of the present invention.

A specific example will now be described below with reference to figures to provide the context of a specific embodiment suitable for explaining the basic principles of the invention. FIG. 1 is a conceptual illustration of method 100 for integrated multi-sensor positioning of a vehicle. Vehicle 10 may utilize a multi-sensor integrated positioning system 12 along with additional onboard inertial reference system 14 to accurately determine a vehicle position. An onboard inertial reference system 14, may include such autonomous onboard positioning systems such as varying gyroscopic sensors (wineglass, iron, ring laser, etc.), and may further include a MEMS IRU. The onboard system may provide an additional source of position information to the hierarchy of positioning signals onboard the vehicle. The positioning system may also receive input from an onboard distance measuring equipment (DME) system 16 that communicates with a plurality of DME ground stations 28 to determine the distance from the vehicle to the ground station (e.g., DME/DME positioning). The DME system 16 may also have a directional capability for determining a bearing to the ground station which, together with altitude information for the vehicle, can be used to determine a position solution for the vehicle. Although position information determined with these onboard systems is generally less accurate and may drift over time, position information from the onboard systems can assist in the detection of gross GNSS positioning signal errors, such those associated with jamming and satellite failure, and also in back-up and recovery modes when the primary GNSS positioning source is not available with the desired accuracy.

Further, method 100 may employ ground based positioning resources 20 to determine the precision position determination. Such resources may preferably include fixed, surveyed RF transmitters. By way of example, these additional ground-based transmitters may include cellular base stations 22, radio broadcast towers 24 and television broadcast towers 26. The multi-sensor integrated positioning system 12 may be further configured to consider additional airborne positioning resources 30, such as other aircraft transmitting UAT 32, ADS-B 34 or TCAS 36 positioning information.

Preferably, the multi-sensor integrated positioning system 12 also receives GNSS positioning signals, when available from multiple GNSS satellites residing in multiple satellite constellations. As a particular example, a robust fault tolerant integrated multi-sensor positioning system can be provided through the use of 64 discrete receivers, each using a different frequency or code (e.g., CDMA) channel to receive positioning information from a different satellite. Up to eight correlators per channel are utilized for signal tracking, signal quality monitoring, and the detection of inaccurate GNSS positioning signals.

Figure 2:
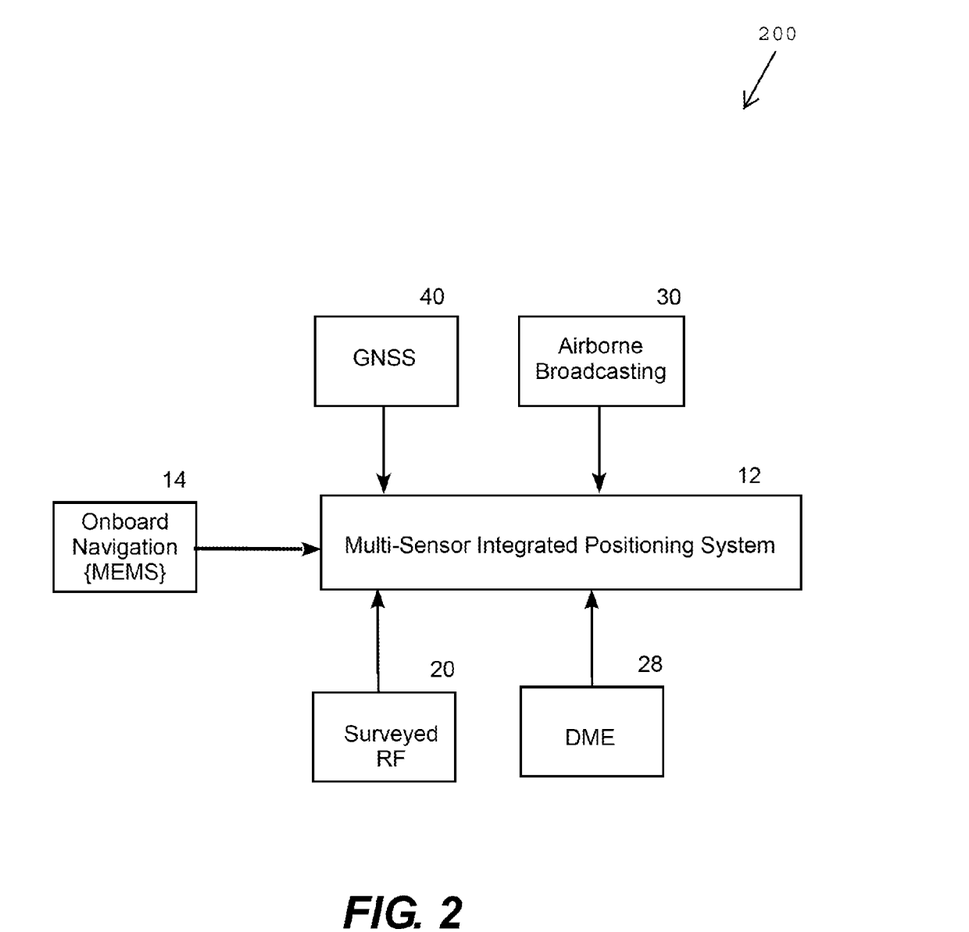
FIG. 2 is a block diagram of a preferred embodiment of integrated multi-sensor positioning.

FIG. 2 is a block diagram of the multi-sensor integrated positioning system 12. This system typically includes or works in concert with an onboard inertial reference system 14 that may include a MEMS inertial reference system, ground-based surveyed RF transmitters 20, a DME system 28, additional airborne positioning resources 30, and the multi-constellation GNSS system 40. The controllers for integrating with all of these positioning resources are preferably located in the same enclosure. It will be understood that auxiliary devices, most notably antennas and displays, are typically located outside the enclosure that houses the controllers. The multi-sensor integrated positioning system 12 may utilize the position information received from these onboard, satellite, airborne, and ground-based positioning resources to detect erroneous GNSS positioning signals and determine an integrated precision position solution for the vehicle without relying on differential position augmentation, such as SBAS or GBAS, from resources offboard the vehicle.

Figure 3:
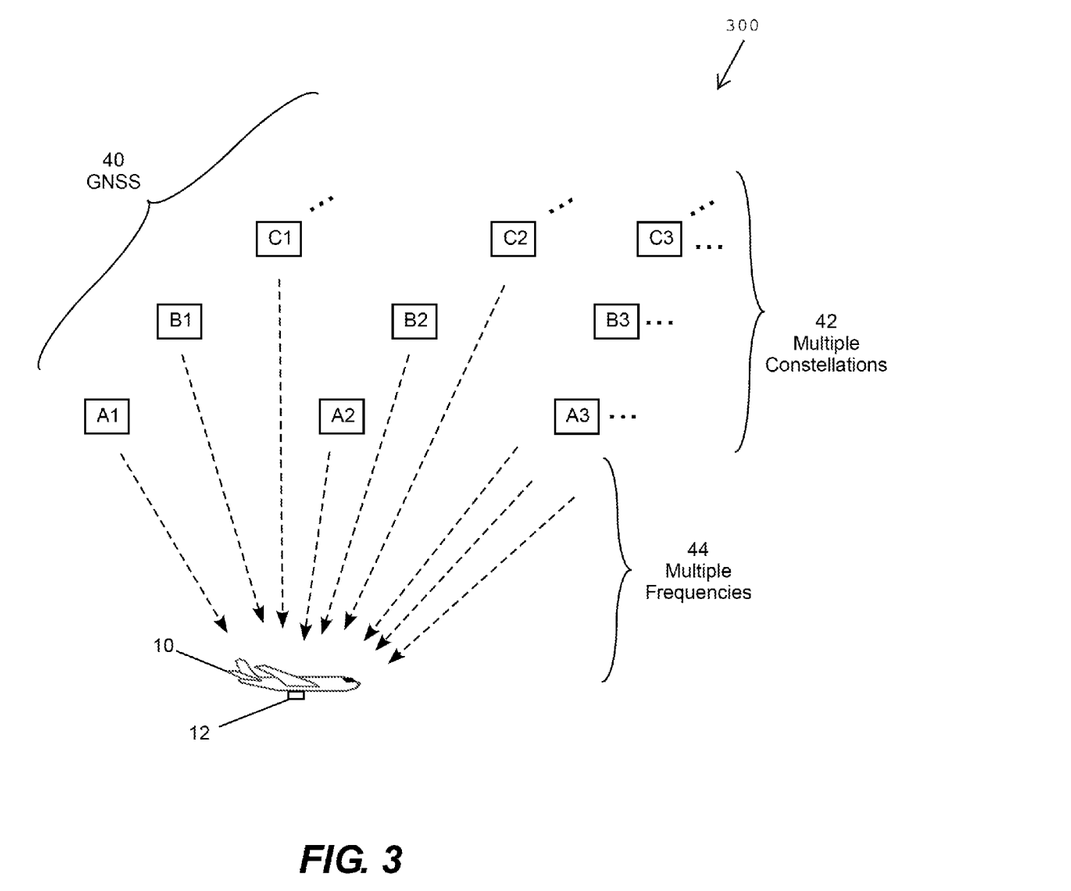
FIG. 3 is a block diagram of a preferred embodiment of integrated multi-sensor positioning system receiving positioning signals from multiple satellites in diverse satellite constellations.

FIG. 3 is a block diagram of the multi-sensor integrated positioning system 12 receiving positioning signals from multiple GNSS satellites in several different satellite constellations 42.

The GNSS receiver onboard the multi-sensor integrated positioning system 12 may take advantage of the multi-constellation, multi-channel GNSS 40 systems currently being deployed. The GNSS 40 includes multiple GNSS constellations represented by constellation "A" with satellites A1-A3, constellation "B" with satellites B1-B3, and constellation "C" with satellites C1-C3. The multi-sensor integrated positioning system 12 receives and uses the GNSS signals from multiple satellite constellations to determine precise positioning information for the vehicle. There may be additional constellations and each constellation typically includes at least eight satellites with at least three or four satellites in view from most places on the Earth most of the time. The satellite constellations are configured to transmit GNSS position signals on different frequency or code (e.g., CDMA) channels. For example, spread spectrum techniques may be employed by each satellite constellation to limit jamming and improve the bandwidth and signal availability.

The multi-sensor integrated positioning system 12 is capable of using multi-constellation, multi-channel GNSS signals to provide precise positioning for the vehicle using only onboard systems, which avoids the need for SBAS or GBAS augmentation. The DME/DME distance measuring system 28 and the inertial reference system 14 and the other positioning resources may be considered in the precision position solution and/or used in back up and to provide recovery modes when GNSS positioning signals with the desired level of accuracy are not available from the GNSS system 40.

Figure 4:
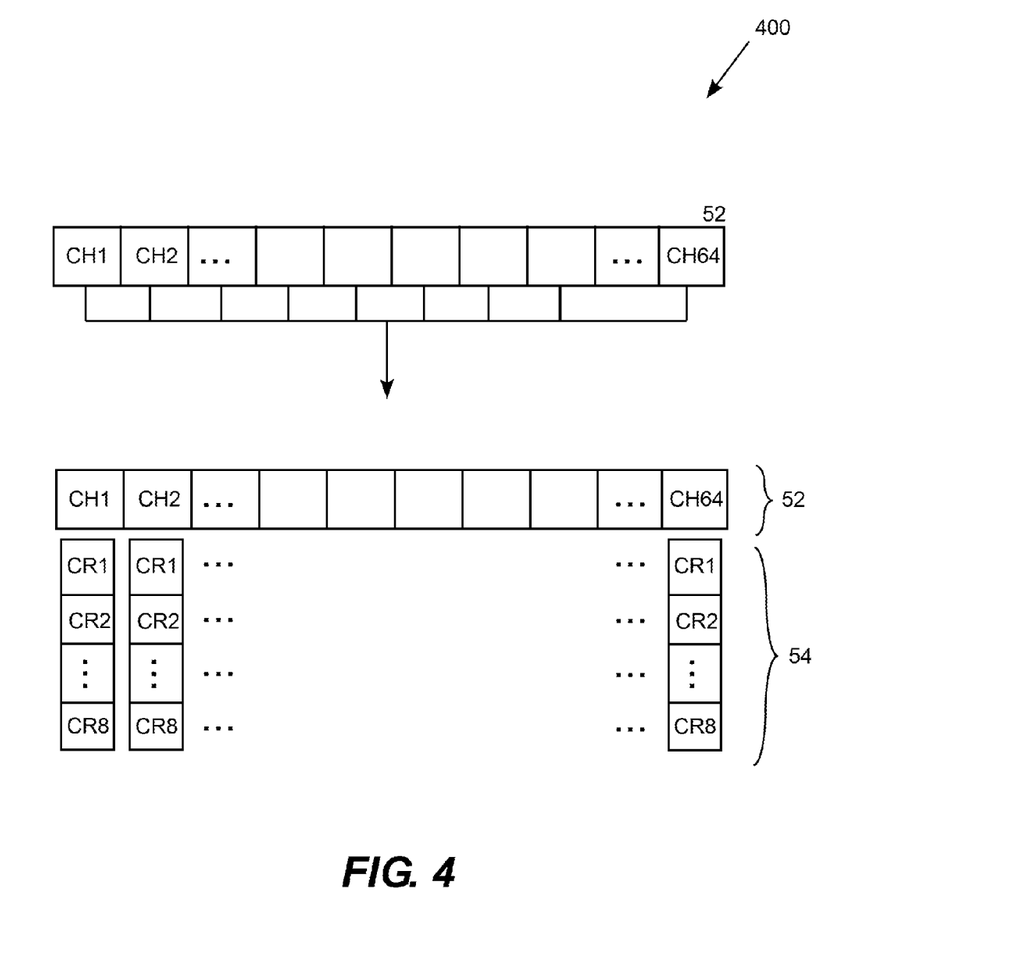
FIG. 4 is a block diagram of a preferred embodiment of integrated multi-sensor positioning receiving positioning signals on multiple tracking channels, each with multiple correlators for detecting inaccurate positioning signals.

FIG. 4 is a more detailed block diagram illustrating the use of multiple tracking channels 52 and multiple correlators 54 for each channel suitable for satellite tracking and signal quality monitoring in the multi-sensor integrated positioning system. In the multi-constellation GNSS system 40, each satellite in each constellation typically transmits its positioning signal using CDMA techniques to provide multiple access. The onboard GNSS system 50 therefore includes multiple channels for receiving the positioning signals from multiple satellites in multiple constellations. In the specific embodiment of the invention shown in FIG. 4, the GNSS system 40 includes 64 tracking channels (typically CDMA code channels), each of which may be used to receive a GNSS position signal from a different satellite. The different satellites typically reside in several different constellations so that satellites in different constellations (as well as satellites within the same constellation) may be correlated to create different precision position solutions. In the specific embodiment, the multi-sensor integrated positioning system 12 further includes up to eight correlators per channel to track multiple signals from the same satellite and to perform signal quality monitoring. While these specific system parameters are considered to be sufficient for evil waveform detection in the integrated positioning system, they are merely illustrative and should not be construed to limit the invention to the specific number of tracking channels or correlators stated for this particular embodiment.

As noted above, in this particular example, the multi-sensor integrated positioning system 12 includes eight correlators 38 per channel that monitor positioning signals quality and detect erroneous positioning signals associated with satellite failure (evil waveforms) but may also result from intentional jamming, atmospheric distortion, intentional error, or other sources of positioning signal inaccuracy. The multi-sensor integrated positioning system 12 then computes a "best" integrated precision position solution based on all of the available positioning information, including the exclusion of any detected erroneous positioning signals.

Figure 5:
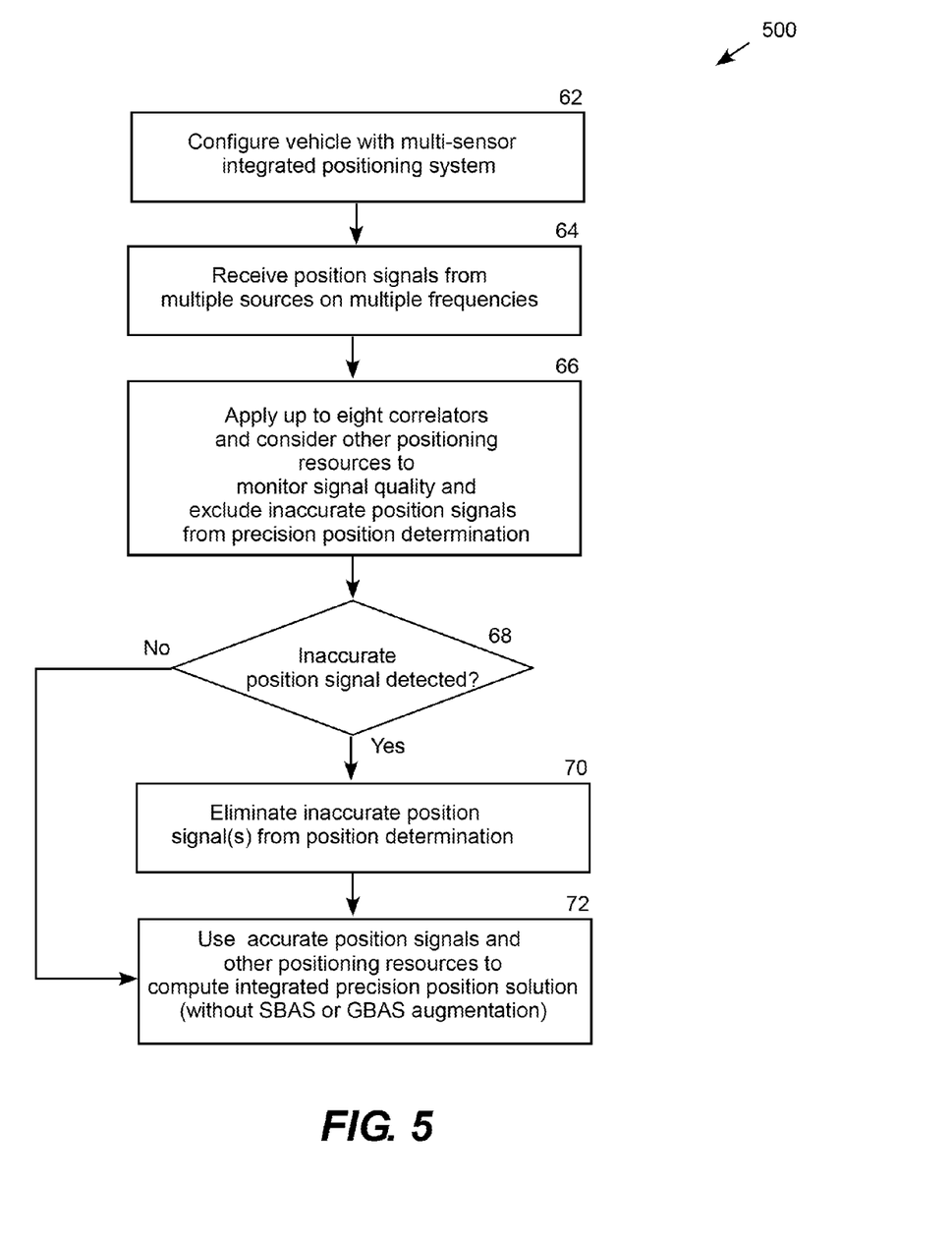
FIG. 5 is a logic flow diagram of a preferred embodiment for determining precise position information from multiple GNSS constellations.

FIG. 5 is a logic flow diagram for Routine 500 for determining integrated precision position solutions using positioning signals received from multiple GNSS constellations. In step 62, a vehicle is configured with a multi-sensor integrated positioning system. Step 62 is followed by step 64, in which the positioning system receives GNSS positioning signals on multiple tracking channels from multiple GNSS satellites residing in multiple constellations. Step 64 is followed by step 66, in which the positioning system utilizes up to eight correlators per channel to monitor GNSS signal quality and optionally considers one or more other positioning resources (e.g., DME, onboard internal reference unit airborne UAT, ADS-B and TCAS, and fixed, surveyed RF broadcasts) to exclude inaccurate GNSS positioning signals form the precision positioning determination. Step 66 is followed by step 68, in which the positioning system determines whether any of the GNSS the positioning signals are inaccurate. If an inaccurate GNSS positioning signal has been detected, the "Yes" branch is followed from step 68 to step 70, in which the inaccurate positioning signal is eliminated from the integrated precision position determination. If an inaccurate GNSS positioning signal has not been detected, the "No" branch is followed from step 68 to step 72. Step 70 is also followed by step 72, in which the positioning system computes an integrated precision position solution based on the accurate GNSS positioning signals and, which may include position signals received from satellites in different constellations. The positioning system may also consider one or more other positioning resources (e.g., DME, onboard internal reference unit airborne UAT, ADS-B and TCAS, and fixed, surveyed RF broadcasts) in the precision positioning determination. It should be appreciated that the integrated precision position solution is determined without relying on SBAS or GBAS differential position augmentation.

Figure 6:
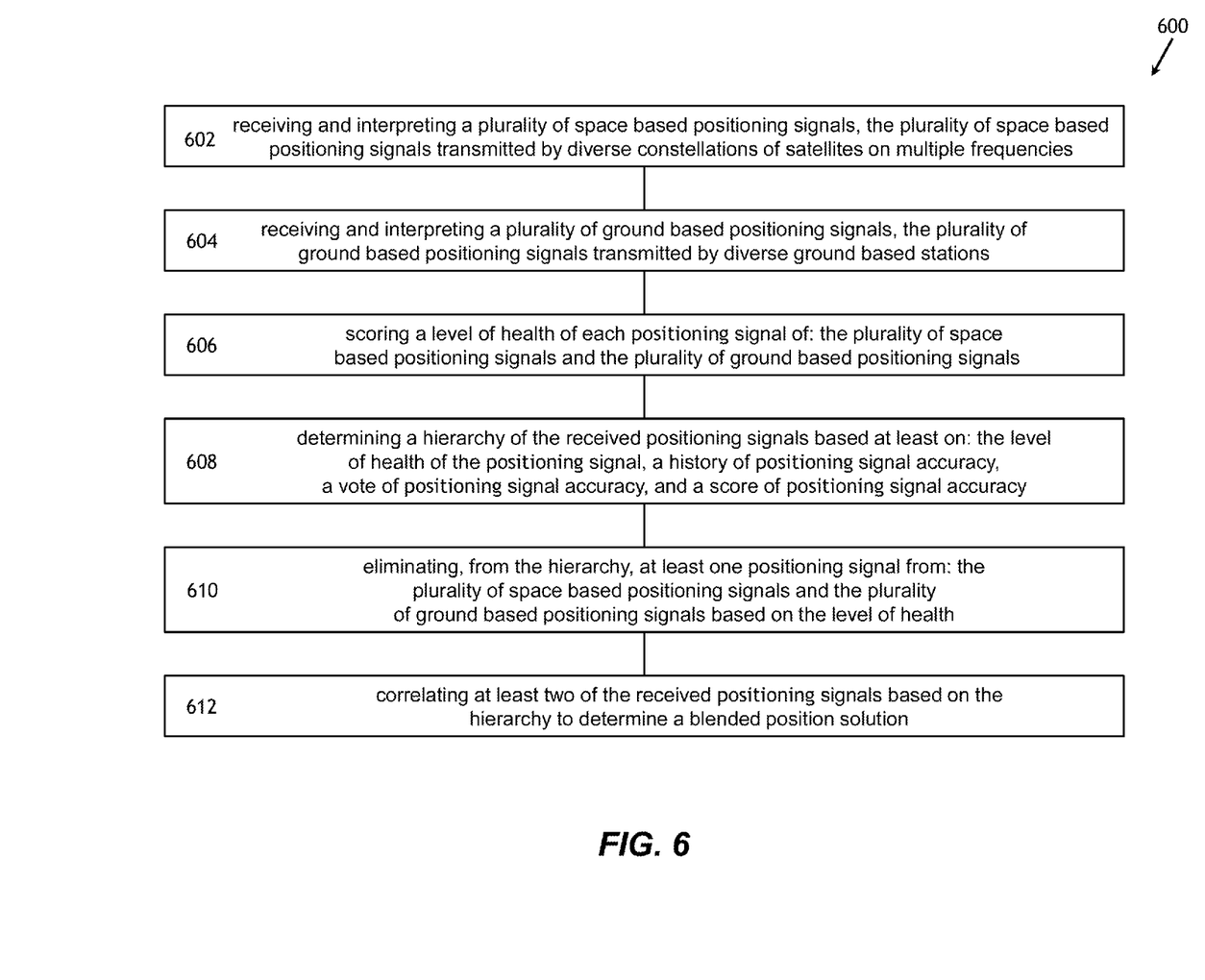
FIG. 6 is a logic flow diagram for a method for integrated multi-sensor positioning of a vehicle representative of a preferred embodiment of the present invention.

FIG. 6 represents a logic flow diagram of a method for integrated multi-sensor positioning of a vehicle representative of a preferred embodiment of the present invention. Step 602 may comprise receiving and interpreting a plurality of space based positioning signals, the plurality of space based positioning signals transmitted by diverse constellations of satellites on multiple frequencies. At step 604, method 600 may include receiving and interpreting a plurality of ground based positioning signals, the plurality of ground based positioning signals transmitted by diverse ground based stations. Method 600 continues, at step 606, with scoring a level of health of each positioning signal of: the plurality of space based positioning signals and the plurality of ground based positioning signals. Step 608 may include determining a hierarchy of the received positioning signals based at least on: the level of health of the positioning signal, a history of positioning signal accuracy, a vote of positioning signal accuracy, and a score of positioning signal accuracy, and step 610 may continue with eliminating, from the hierarchy, at least one positioning signal from: the plurality of space based positioning signals and the plurality of ground based positioning signals based on the level of health. Finally, method 600 may conclude at step 612 with correlating at least two of the received positioning signals based on the hierarchy to determine a blended position solution.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, further transmitted offboard the vehicle, and used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware application is the vehicle; alternatively, if flexibility is paramount, the implementer may opt for a mainly software implementation; or, yet again alternatively, the implementer may opt for some combination of hardware, software, and/or firmware. Hence, there are several possible implementations by which the processes and/or devices and/or other technologies described herein may be effected, none of which is inherently superior to the other. A preferred implementation may be a choice dependent upon the context planned vehicle deployment and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for integrated multi-sensor positioning of a vehicle, comprising:
    receiving and interpreting a plurality of space based positioning signals, the plurality of space based positioning signals transmitted by diverse constellations of satellites on multiple frequencies;
    receiving and interpreting a plurality of ground based positioning signals, the plurality of ground based positioning signals transmitted by diverse ground based stations;

scoring a level of health of each positioning signal of: the plurality of space based positioning signals and the plurality of ground based positioning signals;

determining a hierarchy of the received positioning signals based at least on: the scored level of health of the positioning signal, a history of positioning signal accuracy for each positioning signal, a present score of positioning signal accuracy for each positioning signal, and a vote of positioning signal accuracy;

eliminating, from the hierarchy, at least one positioning signal from: the plurality of space based positioning signals and the plurality of ground based positioning signals based on the level of health;

determining that at least one positioning signal is inaccurate based on reference to at least one of unit airborne universal access transceiver (UAT), automatic dependent surveillance-broadcast (ADS-B) and traffic collision avoidance system (TCAS), and fixed, surveyed radio-frequency (RF) broadcasts;

excluding, from the hierarchy, the inaccurate positioning signal;

correlating at least two of the received positioning signals based on the hierarchy to determine a blended position solution; and displaying the blended position solution to a user.

2. The method for integrated multi-sensor positioning of claim 1, wherein the diverse constellations of satellites further comprise at least two of: a Galileo constellation, a GPS constellation, a Compass constellation, a BeiDou constellation, an IRNSS constellation, and a GLONASS constellation.

3. The method for integrated multi-sensor positioning of claim 1, wherein correlating at least two of the received positioning signals further comprises a determination of the blended position solution of the vehicle without the use of differential position augmentation received from a source offboard the vehicle.

4. The method for integrated multi-sensor positioning of claim 1, wherein the plurality of ground based positioning signals further comprises at least one of: a positioning signal transmitted by an airborne entity, a DME signal, a VOR signal, and an RF signal.

5. The method for integrated multi-sensor positioning of claim 1, wherein the hierarchy is dynamic and changes with a first reception of a positioning signal.

6. The method for integrated multi-sensor positioning of claim 1, wherein the vote of positioning signal accuracy further comprises an analysis of each of the received positioning signals and a consensus among a plurality of correlators.

7. The method for integrated multi-sensor positioning of claim 1, wherein the plurality of ground based positioning signals further includes a signal from a fixed, surveyed, ground-based, RF broadcasting source.

8. The method for integrated multi-sensor positioning of claim 7, wherein the fixed, surveyed, ground-based, RF broadcasting equipment includes one or more of: cellular telephone, radio, and television broadcast stations.

9. The method for integrated multi-sensor positioning of claim 1, wherein the plurality of space based positioning signals further comprises signals in 64 tracking channels, each tracking channel operable for carrying positioning signals from a different satellite.

10. The method for integrated multi-sensor positioning of claim 1, wherein correlating at least two of the received positioning signals based on the hierarchy further comprises eight correlation functions, each correlation function operable to track multiple positioning signals from the same satellite.

11. An onboard system for integrated multi-sensor positioning of a vehicle, comprising:

a receiver configured to receive and interpret a plurality of space based positioning signals and a plurality of ground based positioning signals;

a health monitor processor configured for:
  scoring a level of health of each of the received positioning signals;
  determining a hierarchy of the received positioning signals based at least on: the scored level of health of the positioning signal, a history of positioning signal accuracy for each positioning signal, a present score of positioning signal accuracy for each positioning signal, and a vote of positioning signal accuracy;
  eliminating, from the hierarchy, at least one positioning signal based on the level of health;
  determining that at least one positioning signal is inaccurate based on reference to at least one of unit airborne universal access transceiver (UAT), automatic dependent surveillance-broadcast (ADS-B) and traffic collision avoidance system (TCAS), and fixed, surveyed radio-frequency (RF) broadcasts; and
  excluding, from the hierarchy, the inaccurate positioning signal;

a correlator configured for correlation of at least two of the received positioning signals to determine a blended position solution, the correlation based on the hierarchy and the level of health; and a display for displaying the blended position solution.

12. The onboard system for integrated multi-sensor positioning of claim 11, wherein the correlator is further configured to determine the blended position solution for the vehicle without the use of differential position augmentation from resources offboard the vehicle.

13. The onboard system for integrated multi-sensor positioning of claim 11, wherein the health monitor is further configured to analyze positioning information from one or more other positioning resources in the scoring the level of health of each of the received positioning signals.

14. The onboard system for integrated multi-sensor positioning of claim 11, wherein the vote of positioning signal accuracy further comprises an analysis of each of the received positioning signals and a consensus among a plurality of correlators.

15. A computer readable medium having non-transitory computer readable program code embodied therein for integrated multi-sensor positioning of a vehicle, the computer readable program code comprising instructions which, when executed by a computer device or processor, perform and direct the steps of:

receiving and interpreting a plurality of space based positioning signals, the plurality of space based positioning signals transmitted by diverse constellations of satellites on multiple frequencies;

receiving and interpreting a plurality of ground based positioning signals, the plurality of ground based positioning signals transmitted by diverse ground based stations;

scoring a level of health of each positioning signal of: the plurality of space based positioning signals and the plurality of ground based positioning signals;

determining a hierarchy of the received positioning signals based at least on: the scored level of health of the positioning signal, a history of positioning signal accuracy for each positioning signal, a present score of positioning signal accuracy for each positioning signal, and a vote of positioning signal accuracy;

eliminating, from the hierarchy, at least one positioning signal from: the plurality of space based positioning signals and the plurality of ground based positioning signals, based on the level of health;

determining that at least one positioning signal is inaccurate based on reference to at least one of unit airborne universal access transceiver (UAT), automatic dependent surveillance-broadcast (ADS-B) and traffic collision avoidance system (TCAS), and fixed, surveyed radio-frequency (RF) broadcasts;

excluding, from the hierarchy, the inaccurate positioning signal;

correlating at least two of the received positioning signals based on the hierarchy to determine a blended position solution; and displaying the blended position solution.

16. The computer readable medium of claim 15, wherein the diverse constellations of satellites further comprise at least two of: a Galileo constellation, a GPS constellation, a Compass constellation, a BeiDou constellation, an IRNSS constellation, and a GLONASS constellation.

17. The computer readable medium of claim 15, wherein correlating at least two of the received positioning signals further comprises a determination of the blended position solution of the vehicle without the use of differential position augmentation received from a source offboard the vehicle.

18. The computer readable medium of claim 15, wherein the plurality of ground based positioning signals further comprises at least one of: a positioning signal transmitted by an airborne entity, a DME signal, a VOR signal, and an RF signal.

19. The computer readable medium of claim 15, wherein the hierarchy is dynamic and changes with a first reception of a positioning signal.

20. The computer readable medium of claim 15, wherein the plurality of ground based positioning signals further includes a signal from a fixed, surveyed, ground-based, RF broadcasting source.

21. The computer readable medium of claim 20 wherein the fixed, surveyed, ground-based, RF broadcasting equipment includes one or more of: cellular telephone, radio, and television broadcast stations.

22. The computer readable medium of claim 15, wherein the plurality of space based positioning signals further comprises signals in 64 tracking channels, each tracking channel operable for carrying positioning signals from a different satellite.

23. The computer readable medium of claim 15, wherein correlating at least two of the received positioning signals based on the hierarchy further comprises eight correlation functions, each correlation function operable to track multiple positioning signals from the same satellite.

24. A method for integrated multi-sensor positioning of a vehicle, comprising:

receiving and interpreting, with a processor, a plurality of space based positioning signals, the plurality of space based positioning signals transmitted by diverse constellations of satellites on multiple frequencies;

receiving and interpreting, with the processor, a plurality of ground based positioning signals, the plurality of ground based positioning signals transmitted by diverse ground based stations;

receiving and interpreting, with the processor, a plurality of onboard positioning signals, the plurality of onboard positioning signals based on at least one onboard positioning system;

scoring, with the processor, a level of health of each positioning signal of: the plurality of space based positioning signals, the plurality of ground based positioning signals, and the plurality of onboard positioning signals;

determining, with the processor, a hierarchy of the received positioning signals based at least on: the scored level of health of the positioning signal, a history of positioning signal accuracy for each positioning signal, a present score of positioning signal accuracy for each positioning signal, and a vote of positioning signal accuracy;

eliminating, from the hierarchy, at least one positioning signal from: the plurality of space based positioning signals, the plurality of ground based positioning signals and the plurality of onboard positioning signals based on the level of health;

determining, with the processor, that at least one positioning signal is inaccurate based on reference to at least one of unit airborne universal access transceiver (UAT), automatic dependent surveillance-broadcast (ADS-B) and traffic collision avoidance system (TCAS), and fixed, surveyed radio-frequency (RF) broadcasts;

excluding, from the hierarchy, the inaccurate positioning signal;

correlating, with the processor, at least two of the received positioning signals based on the hierarchy to determine a blended position solution; and displaying the blended position solution on a display device.

25. The method for integrated multi-sensor positioning of claim 24, wherein the hierarchy is comprised of at least one positioning signal from a first constellation, at least one positioning signal from a diverse second constellation, at least one positioning signal from the plurality of ground based positioning signals, and at least one positioning signal from the plurality of onboard positioning signals.

26. The method for integrated multi-sensor positioning of claim 24, wherein one of the at least one onboard positioning system is an onboard inertial reference system.

27. The method for integrated multi-sensor positioning of claim 24, wherein the onboard inertial reference system comprises a MEMS inertial reference system.

* * * * *